United States Patent [19]
Amano

[11] 4,021,607
[45] May 3, 1977

[54] VIDEO DISPLAY SYSTEM EMPLOYING DRIVE PULSE OF VARIABLE AMPLITUDE AND WIDTH

[75] Inventor: Yoshifumi Amano, Zushi, Japan

[73] Assignee: Sony Corporation, Tokyo, Japan

[22] Filed: May 13, 1974

[21] Appl. No.: 469,606

[30] Foreign Application Priority Data

May 19, 1973  Japan .................. 48-59020[U]

[52] U.S. Cl. .................. 358/230; 315/169 TV; 358/153; 358/168
[51] Int. Cl.² .................. H04N 5/70; H05B 37/02
[58] Field of Search .................. 178/7.3 D; 358/59; 340/324 M, 173 LS, 166 CZ; 315/169 TV

[56] References Cited
UNITED STATES PATENTS

| | | | |
|---|---|---|---|
| 3,627,924 | 12/1971 | Fleming et al. | 178/7.3 |
| 3,696,393 | 10/1972 | McDonald | 178/7.3 |
| 3,752,910 | 8/1973 | Lewis | 178/7.3 |
| 3,761,617 | 9/1973 | Sato et al. | 178/7.3 |
| 3,801,864 | 4/1974 | Yamane et al. | 315/169 |
| 3,803,449 | 4/1974 | Schmersal | 315/169 |
| 3,883,778 | 5/1975 | Kaji et al. | 178/7.3 |

*Primary Examiner*—John C. Martin
*Attorney, Agent, or Firm*—Lewis H. Eslinger; Alvin Sinderbrand

[57] ABSTRACT

A video display system employs a flat panel of the X-Y matrix type with a brightness control circuit in which both the amplitude and the duration of driving pulses for the display panel are varied in response to variations in the sequentially sampled level of input video signals. In a preferred brightness control circuit, variations in the sequentially sampled level of the input video signals are converted into digitally coded signals which selectively energize respective pulse generators operative to produce pulses of correspondingly weighted durations and amplitudes which overlap in time, and such pulses are combined to provide the amplitude- and width or duration-modulated driving pulses for the display panel.

8 Claims, 9 Drawing Figures

VIDEO DISPLAY SYSTEM EMPLOYING DRIVE PULSE OF VARIABLE AMPLITUDE AND WIDTH

BACKGROUND OF THE INVENTION

1. Field of the Invention

This invention relates generally to a video display system, and more particularly to such a system which includes a flat panel of X-Y matrix type and an improved brightness control circuit for driving the panel.

2. Description of the Prior Art

Recently, video display systems utilizing a flat panel of X-Y matrix type have become the object of considerable interest.

In such systems, different kinds of flat pannels, such as, gas discharge panels liquid crystal panels electroluminescent panels and the like have been used, and extensive research has been conducted in respect to the flat panels and their driving circuits.

However, the video display systems of the prior art are still unable to reproduce pictures with good quality on the flat panel.

One of the sources of the difficulties is to provide a brightness control circuit which responds to changes in the level of the video signal with sufficient accuracy. In more detail, the brightness control of the panel used in the prior art is usually achieved by varying either the amplitude or the duration of the current or driving pulse of the display cell of the display panel. These two methods are respectively referred to as "PAM" for pulse amplitude modulation and "PWM" for pulse width modulation. Inherent in the "PAM" method is the difficulty in obtaining driving transistors with sufficiently uniform characteristics to achieve brightness control with good quality for a substantial range of different pulse amplitudes.

On the other hand, the "PWM" method has disadvantageous in that sufficient number of steps or grades of brightness cannot be obtained because of the time delay of the display panel.

OBJECTS AND SUMMARY OF THE INVENTION

Accordingly, it is an object of this invention to provide an improved video display system of the type referred to above, and in which the inherent disadvantages of the prior art are avoided.

It is a further object of this invention to provide an improved video display system having a flat panel of X-Y matrix type with a brightness control circuit which responds to changes in the level of the video signal with sufficient accuracy to afford a picture of good quality or resolution.

In accordance with an aspect of this invention, the brightness control circuit of a video display system having a flat panel of the X-Y matrix type provides driving pulses for the panel which vary or are modulated both in amplitude and duration in response to variations in the sequentilly sampled level of input video signals.

In a preferred embodiment of the invention, variations in the sequentially sampled level of the input video signals are converted into digitally coded signals which selectively energize respective pulse generators to cause the latter to produce pulses of correspondingly weighted durations or widths and amplitudes and which overlap in time, and the pulses produced in response to the sampling of any particular detected or sampled level of the video signals are combined to provide the width or duration- and amplitude-modulated driving pulses for the display panel.

DESCRIPTION OF THE PREFERRED EMBODIMENT

Figure 1:
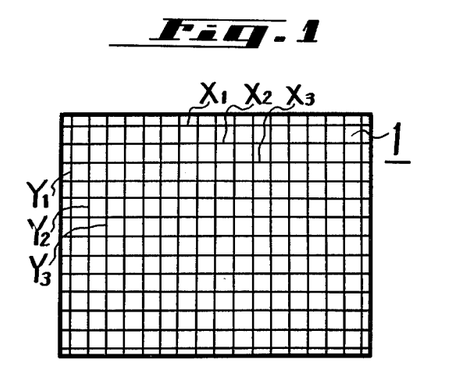
FIG. 1 is a schematic front view of a flat display panel that maybe used in the video display system according to the present invention.

As shown in FIG. 1, a video display panel or flat panel 1 of the known X-Y matrix type which may be employed in a video display system according to this a plurality of row lines $X_1$, $X_2$, $X_3$, . . . parallel with one another and a plurality of column lines $Y_1$, $Y_2$, $Y_3$, . . . parallel with one another and perpendicular to the row lines $X_1$, $X_2$, $X_3$, . . .

Figure 2:
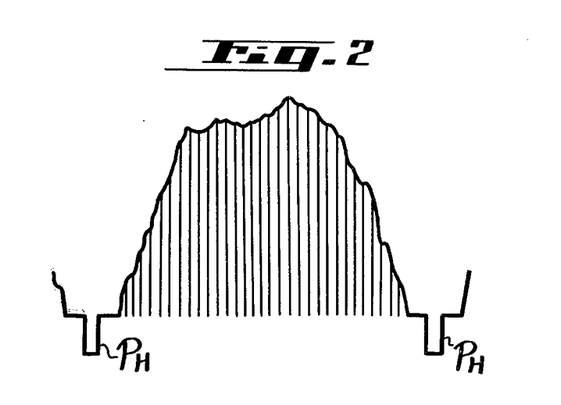
FIGS. 2 and 3 are waveform diagrams to which reference will be made in the sampling of an input video signal.

Light emission is made to occur selectively at the intersections of the row and column lines to display a picture or image corresponding to the video signal of a television signal or the like. The display panel 1 may be a gas discharge panel, a liquid display panel, an electroluminescent panel or the like. Where a gas discharge panel is used, by way of example, the row lines $X_1$, $X_2$, . . . are formed as its anodes, while the column lines $Y_1$, $Y_2$, . . . are formed as its cathodes spaced a suitable distance from the row lines $X_1$, $X_2$, . . . . Switching transistors connected to the row lines $X_1$, $X_2$, . . . are made conductive sequentially in successive horizontal period to apply a predetermined voltage to the row lines $X_1$, $X_2$, . . . in succession, and a video signal occurring between horizontal sync. signals $P_H$, as shown in FIG. 2, is sampled sequentially. Then, the sampled video signal, which is held at a suitable sampled value for a suitable time interval, is sequentially supplied to transistors connected to the column lines $Y_1$, $Y_2$, . . . to sequentially emit light at the intersections of the column lines $Y_1$, $Y_2$ . . . with the row line to which voltage is then applied, with the brightness at the successive intersections varying in accordance with the sequentially sampled levels of the video signal.

The brightness of the gas discharge panel can be controlled by varying either the amplitude or the duration of a current flowing in the display element. These two methods are respectively referred to as PAM for pulse amplitude modulation and PWM for pulse width modulation.

In the case of the PAM method, it is difficult to provide the column line driving transistors with sufficiently uniform characteristics to achieve uniform brightness control over a substantial range of variation of the sampled video signals so that good quality brightness control of the display panel by means of the PAM method cannot be realized.

Figure 3:
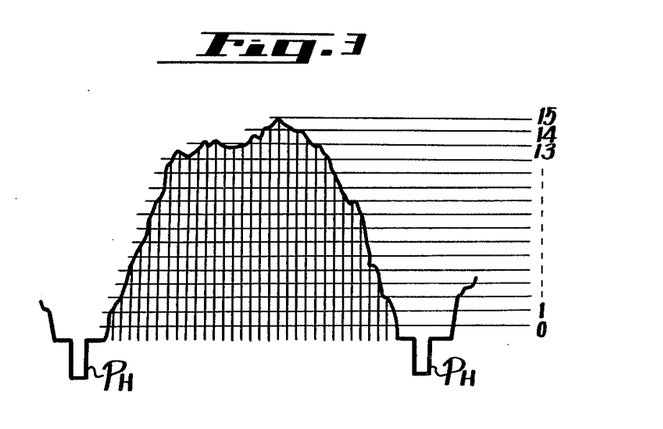

In the PWM method, pulse signals with a constant amplitude and with the pulse widths being varied in response to the sampled values of the video signal are applied to the transistors connected to the column lines $Y_1, Y_2 \ldots$ to make them conductive in sequence for periods corresponding to the respective pulse widths. Thus, the duration of light emission is varied at the successive intersections to control the brightness. In practice, the level of the video signal is divided into, for example, sixteen steps or grades of 0 to 15, as shown in FIG. 3, and the pulse width is changed in a step-wise manner in accordance with the step or grade of the sampled value, as shown in FIG. 4.

Since the transistors associated with the column lines $Y_1, Y_2 \ldots$ are used as switching elements in the PWM method, uniform brightness control can be achieved at the respective column lines.

However, where gas discharge elements, liquid crystal elements electroluminescent elements and so on are employed as display cells of the display panel, there is a certain delay time between the application of driving voltage to the display cells and the onset of light emission from the display cells. By way of example, in the case of glow discharge of gas discharge elements, the delay time is about 10 micro seconds.

Figure 4:
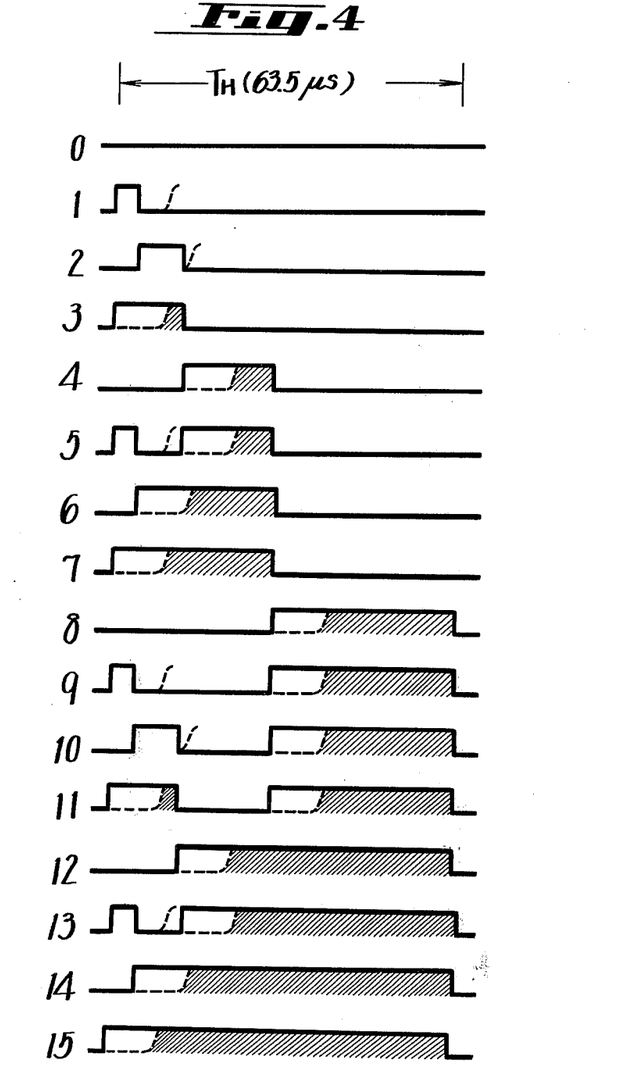
FIG. 4 is a waveform diagram to which reference will be made in explaining how brightness control is effected in one of the video display systems of the prior art.

Accordingly, when the driving voltage with its pulse width being varied as described above is applied to the display cells, the time intervals during which the light emission is actually taken place for the several steps or levels 0–15 of the sampled video signal are indicated by cross-hatching on FIG. 4. When the step [1] is detected or sampled, the pulse width is 63.5/15 micro seconds, that is, approximately 4 micro seconds, where 63.5 micro seconds correspond to one horizontal or scanning period $T_H$. Similarly, when the step [2] is detected or sampled, the pulse width is about 8 micro seconds, so that, in each of the above cases, the time delay exceeds the pulse width and no light emission takes place. When the sampled level of the video signal is step [8], the pulse width is about 32 micro seconds; whereas, when the sampled levels are [9] and [10], the corresponding pulses are constituted by a short initial pulse of about 4 micro seconds and 8 micro seconds duration, respectively, followed by a pulse of about 32 micro second duration. By reason of the above mentioned time delay, no light emission would actually occur during the initial short pulse for the sampled step [9] or [10], so that the durations of light emission would be the same for all of steps [8], [9] and [10]. Accordingly, if the level of the sampled video signal is divided by as many as sixteen steps, the PWM method cannot achieve accurate variation of the brightness level in response to variations in the level of the video signal. Therefore, in existing video display systems employing the PWM method for brightness control, it is the practice to divide the range of variation of the level of the video signal into a relatively low number of steps, for example, no more than eight steps, so that the shortest pulses for driving the column lines will have a width or duration exceeding the time delay of the display cells. However, in that case, the resulting displayed picture or image is of rather poor resolution or quality as the variation of brightness in the displayed picture only roughly correspond to the variations in the video signal.

In order to avoid the foregoing problems associated with the PAM and PWM methods of brightness control, the video display system according to the present invention generally comprises a row line driving circuit which drives the row lines $X_1, X_2, X_3 \ldots$ sequentially in synchronism with the horizontal sync signals, a column line driving circuit which drives the column lines $Y_1, Y_2, Y_3 \ldots$ sequentially during each horizontal period, and a pulse generating circuit providing pulses for the column line driving circuit which vary or are modulated both in amplitude and duration in response to variations in the sequentially sampled level of the input video signals. Since such pulses are varied both as to amplitude and duration or width, a relatively large number of steps in the sampled level of the video signals can be characterized by corresponding pulses which differ from each other by a relatively small number of substantially different amplitudes and by a relatively small number of substantially different durations or widths, whereby to avoid the above described problems associated with the PAM and PWM methods of brightness control.

An embodiment of the video display system according to this invention will be now described with reference to FIG. 5.

Figure 5:
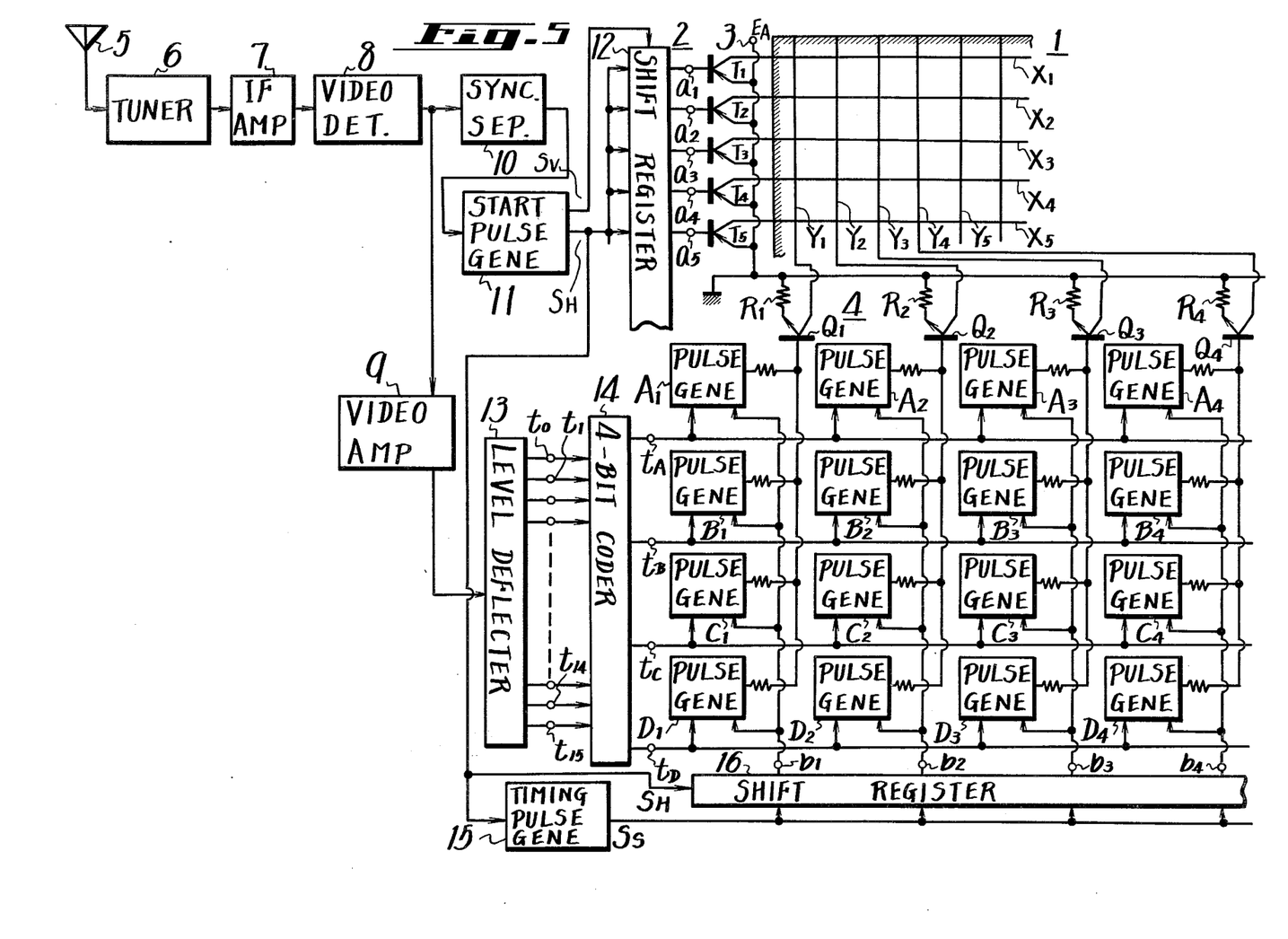
FIG. 5 is a black diagram showing an embodiment of the video display system according to the present invention.

In FIG. 5, only a portion of the display flat panel 1 is shown to have a plurality of row lines $X_1, X_2, \ldots$ and a plurality of column lines $Y_1, Y_2, \ldots$ in the same manner as described in connection with FIG. 1. In the embodiment of FIG. 5, the light emission or radiation by gas discharge elements is employed for display, so that the row lines $X_1, X_2, \ldots$ are used as anodes and the column lines $Y_1, Y_2, \ldots$ are used as cathodes. A row line driving circuit 2 is shown to include transistors $T_1, T_2, \ldots$ having their collector electrodes connected to the row lines $X_1, X_2, \ldots$ respectively, while their emitter electrodes are connected together to a voltage source terminal 3 to which a positive voltage $E_A$ is applied. A column line driving circuit 4 is shown to include transistors $Q_1, Q_2, \ldots$ having their collector electrodes connected to the column lines $Y_1, Y_2, \ldots$ respectively, while their emitter electrodes are grounded through resistors $R_1, R_2, \ldots$, respectively.

The video display system embodying this invention is fuurther shown to include an antenna 5 for receiving broadcast television signals and a tuner 6 connected to the antenna 5 for selecting the channel to be viewed. The output of the tuner 6 is applied to an i.f. amplifier 7, which supplies amplified signals to a video detector 8.

Figure 6:
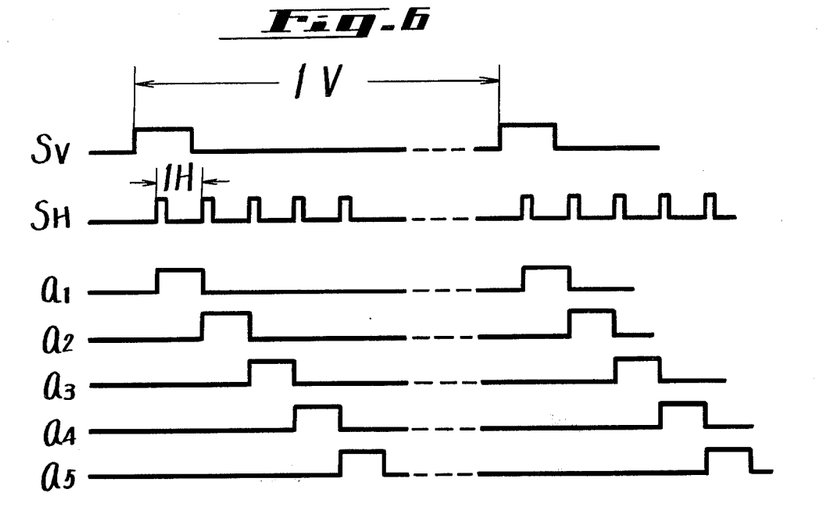
FIGS. 6 to 9 are waveform diagrams to which reference will be made in explaining the operation of the video display system shown in FIG. 5.

The output terminal of the video detector 8 is connected to a video amplifier 9, and also to a sync. separator 10 which separates vertical and horizontal synchronizing signals from the video signals detected by the video detector 8. The output signal from the sync. separator 10 is applied to a start pulse generator 11 which, as shown on FIG. 6, produces a vertical start pulse $S_V$ for each vertical sync signal, with each pulse $S_V$ being delayed by a predetermined time interval from the respective vertical sync signal, and during which time interval the display is taken place for each field. Further, generator 11 produces a horizontal start pulse $S_H$ for each horizontal sync signal, with each pulse $S_H$ being delayed by a predetermined time interval from the horizontal sync signal, and during which time interval the display is taken place for the respective horizontal period. The vertical start pulse $S_V$ is applied to a shirt register 12 as an input signal and the horizontal start pulse $S_H$ is also applied to the shift register 12 as a clock pulse train. At output terminals $a_1, a_2, \ldots$ of the shift register 12 there are obtained driving pulses which are sequentially delayed by one horizontal or scanning period in respect to each other (FIG. 6), and which have a pulse width corresponding to one horizontal period (1H) from the generation of the horizontal start pulse $S_H$, as shown in FIG. 6. The driving pulses obtained at the output terminals $a_1$, $a_2$, ... are applied to the base electrodes of the transistors $T_1$, $T_2$, ... of the row line driving circuit 2 in such a manner that the transistors $T_1$, $T_2$, ... are made conductive one after another for one horizontal period (1H) and delayed by one horizontal period (1H) from the generation of the horizontal start pulse $S_H$. Thus, the row lines $X_1$, $X_2$, ... are successively supplied with the positive voltage $E_A$ from the terminal 3 through the transistors $T_1$, $T_2$, ..., respectively. In other words, the shift register 12 serves as a pulse generator for driving the row lines $X_1$, $X_2$, ... sequentially.

At the same time, the video signal from the video amplifier 9 is applied to a level detector 13 in which the level of the video signal is divided into a number, for example, sixteen (0 tp 15), of steps or grades, as shown in FIG. 3. The level detector 13 produces an output signal at a selected one of its output terminals $t_0$, $t_1$, ..., $t_{15}$ in accordance with the instantaneously detected level of the video signal. Each of the output signals delivered to the terminal $t_0$, $t_1$, ..., $t_{15}$ is applied to a 4-bit coder 14 which produces a 4-bit binary coded signal corresponding to the video signal level represented by the signal appearing at the respective one of the 16 terminals $t_o$ - - -$t_{15}$.

The 4-bit binary coded signals appear as various combinations of the potential levels and at the output terminals $t_A$, $t_B$, $t_C$ and $t_D$ which represent the decimal values 1, 2, 4 and 8, respectively. The potential appearing at the output terminal $t_A$ is applied to a first group of pulse generators $A_1$, $A_2$, ...; the potential appearing at the terminal $t_B$ is applied to a second group of pulse generators $B_1$, $B_2$, ...; the potential appearing at the terminal $t_C$ is applied to a third group of pulse generator $C_1$, $C_2$, ...; and the potential appearing at the terminal $t_D$ is applied to a fourth group of pulse generators $D_1$, $D_2$, ...

Figure 7:
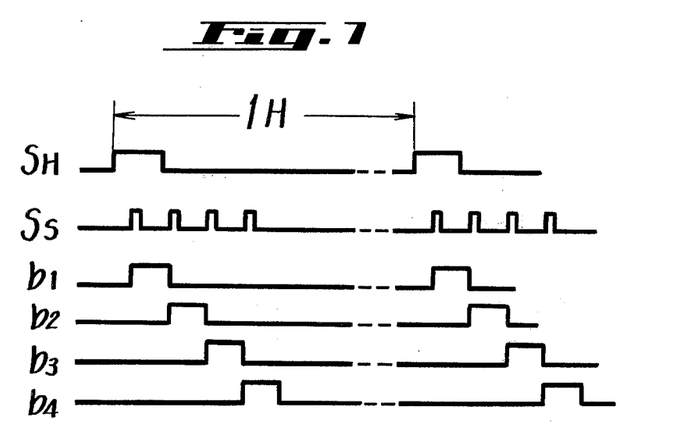

The horizontal start pulse $S_H$ from the start pulse generator 11 is also applied to a timing pulse generator 15 which produces a pulse $S_S$ with a predetermined period which is the same as the sampling time interval, as shown in FIG. 7.

The horizontal start pulse $S_H$ in FIG. 7 corresponds to that in FIG. 6, but is shown on an enlarged scale. The horizontal start pulse $S_H$ and the pulse $S_S$ from the timing pulse generator 15 are applied to a shift register 16 as an input signal and a clock pulse train, respectively. Thus, the shift register 16 produces at its output terminals $b_1$, $b_2$, ... sampling gate signals which are delayed one after the other by the period of the pulse as shown in FIG. 7. Accordingly, shift register 16 can be considered a sampling gate signal generator.

The output signal obtained at the output terminal $b_1$ is applied to the pulse generators $A_1$, $B_1$, $C_1$ and $D_1$; the output signal at the terminal $b_2$ is applied to the pulse generators $A_2$, $B_2$, $C_2$ and $D_2$, and so on. In other words the sampling gate signals obtained at each of the output terminals $b_1$, $b_2$, ... sequentially are applied to the four pulse generators identified by the letters A, B, C and D to which the same numerical subscripts are appended.

Figure 8:
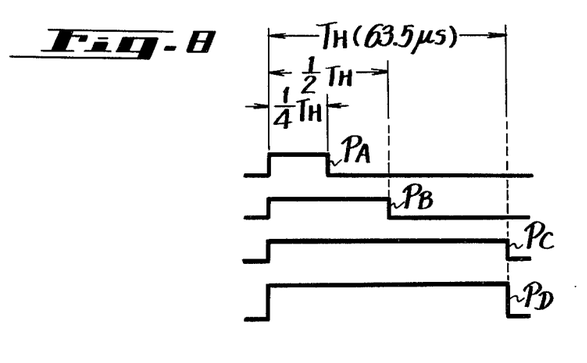

Each of the first group of pulse generators $A_1$, $A_2$, ..., each of which may represent the decimal value 1, may be formed of, for example, a monostable multivibrator producing a current pulse $P_A$ with the pulse width $\theta$ $T_H$ ($T_H$=horizontal period) and a predetermined amplitude, as shown in FIG. 8, when the output of the 4-bit coder 14 at the terminal $t_A$ is the potential [1] and the sampling gate pulse of the shift register 16 is applied to such pulse generator $A_1$, or $A_2$, or $A_3$ - - -. Similarly, each of the second group of pulse generators $B_1$, $B_2$, ... may be formed of, for example, a monostable multivibrator which produces a current pulse $P_B$ with the pulse width ½ $T_H$ and the same amplitude as the pulse $P_A$, as shown in FIG. 8, when the output signal of the 4-bit coder 14 provides the potential at the terminal $t_B$ and the sampling gate pulse of the shift register 16 is applied to the pulse generator $B_1$ or $B_2$ or $B_3$ - - -. Each of the third group of pulse generators $C_1$, $C_2$, ... may be formed of, for example, a bistable multivibrator which produces a current pulse $P_C$ with the pulse width $T_H$ and the same amplitude as the pulse $P_A$ as shown in FIG. 8, when the output signal of the 4-bit coder 14 provides the potential [1] at the terminal $t_C$ and the sampling gate pulse of the shift register 16 is applied to the pulse generator $C_1$ or $C_2$ or $C_3$ - - - . Finally, each of the fourth group of pulse generators $D_1$, $D_2$, ... may be formed of, for example, a bistable multivibrator which provides a current pulse $P_D$ with the pulse width of $T_H$ and an amplitude twice that of any of the pulses $P_A$, $P_B$ and $P_C$, as shown in FIG. 8, when the output signal of the 4-bit coder 14 provides the potential [1] at the terminal $t_D$ and the sampling gate pulse of the shift register 16 is applied to the pulse generator $D_1$, $D_2$ or $D_3$ - - - . It will be apparent that the current pulse $P_A$, $P_B$, $P_C$ and $P_D$ are basic pulses and are weighted by their respective widths and amplitudes, to represent the decimal values of 1, 2, 4 and 8, respectively.

As shown on FIG. 5, the output terminals of pulse generators $A_1$, $B_1$, $C_1$, and $D_1$ are connected together through suitable resistors to the base electrode of transistor $Q_1$; the output terminals of pulse generators $A_2$, $B_2$, $C_2$ and $D_2$ are connected together through suitable resistors to the base electrode of transistor $Q_1$; and so on. Therefore, in response to the sampling gate pulse appearing at any one of the output terminals $b_1$, $b_2$- - - of shift register 16, for example, at the terminal $b_1$, one or more of the basic current pulses $P_A$, $P_B$, $P_C$ and $P_D$ may be produced by the respective pulse generators $A_1$, $B_1$, $C_1$ and $D_1$ in dependence on the 4-bit binary coded signal which issues from coder 14 in response to the level of the video signal then being detected in level detector 13. Since any two or more of such basic current pulses $P_A$, $P_B$, $P_C$ and $P_D$ overlap in time, as shown on FIG. 8, any basic current pulses produced by generators $A_1$, $B_1$, $C_1$ and $D_1$ upon the appearance of a sampling gate pulse at terminal $b_1$ are simply combined into a respective driving current pulse of characteristic width or duration and amplitude which is supplied to the base electrode of the respective transistor $Q_1$.

Figure 9:
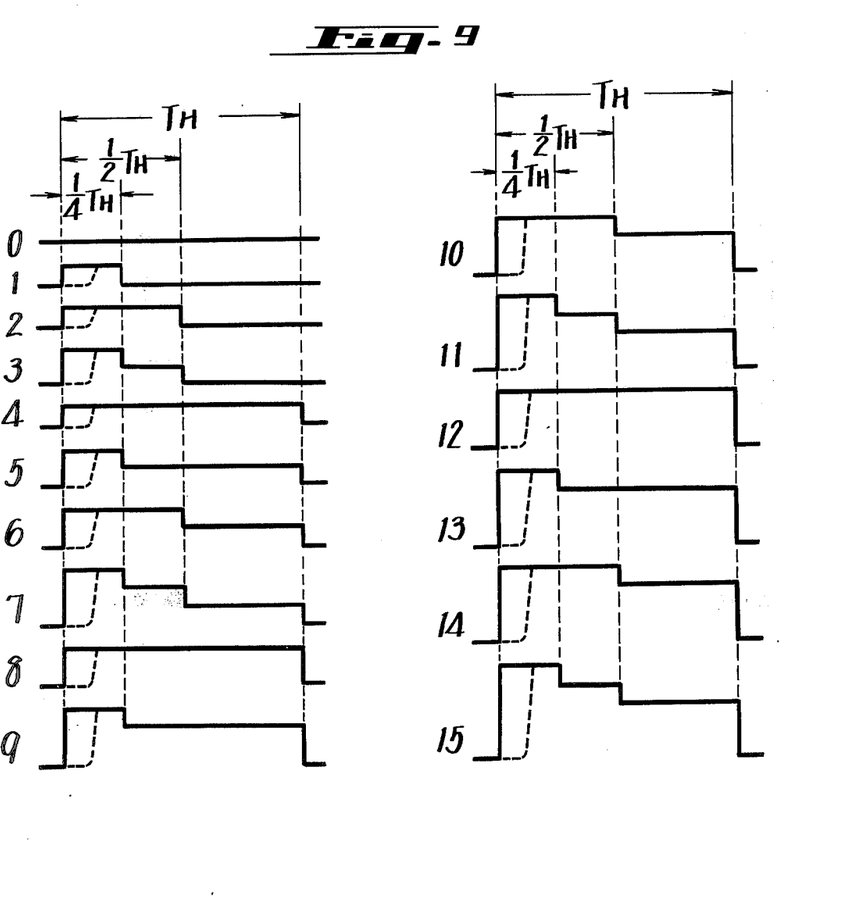

As shown on FIG. 9, the simple combination of the four basic current pulses $P_A$–$P_D$ makes it possible to obtain sixteen different types of driving current pulses which respectively represent the detected levels 0 to 15, inclusive, of the input video signals, and any one of those sixteen different driving current pulses, which are distinguished from each other by their widths and/or by their amplitudes, is supplied to the base electrodes of the transistors Q1, Q2 - - - in synchronism with the sampling gate pulses sequentially provided at the outut terminals $b_1$, $b_2$, - - - of shift register 16.

The operation of the systems shown in FIG. 5 will be now described in detail. When the transistor $T_1$ is made conductive during the initial horizontal period of each field of the video signal and the positive voltage $E_A$ is applied to the row line $X_1$. With the sampling gate pulse being first obtained at the output terminal $b_1$ and assuming that, at this time, the level of the video signal is, for example, [1] at the black level side as shown in FIG. 3, the output at the output terminal $t_1$ of the level detector 13 becomes [1] and only the output terminal $t_A$ of the 4-bit coder 14 exhibits the logic [1]. Thus, only the pulse generator $A_1$ is operated to produce the pulse $P_A$ which is shown in FIG. 9 to represent the decimal value [1] and which is applied to the base electrode of the transistor $Q_1$ as the driving pulse. Accordingly, the transistor $Q_1$ is made conductive in such a manner that the impedance between the collector-emitter of the transistor $Q_1$ is controlled in accordance with the width and amplitude of the pulse $P_A$, and discharge occurs between the row line $X_1$ and the column line $Y_1$ to emit light at the intersection of the lines $X_1$ and $Y_1$. In this case, the brightness of the emitted light, as determined by the amplitude and width of the pulse $P_A$, corresponds to step [1] of the video signal level. Thereafter, when the sampling gate pulse is obtained at the next output terminal $b_2$ and assuming that the detected level of the video signal is then, for example, at the step [3] shown in FIG. 3, the output at the terminal $t_3$ of the level detector 13 becomes [1] and, accordingly the outputs at the terminals $t_A$ and $t_B$ of the 4-bit coder 14 become [1]. As a result, the pulses $P_A$ and $P_B$ are obtained from the pulse generators $A_2$ and $B_2$, respectively, and hence the pulse which results from combining the pulses $P_A$ and $P_B$ with each other as, shown in FIG. 9 at step [3], is applied to the transistor $Q_2$ as the driving pulse. Thus, a discharge occurs between the row $X_1$ and the column line $Y_2$ to emit light at the intersection thereof. In this case, since the duration of the driving pulse is ½ $T_H$, that is, twice the duration of the driving pulse applied at the intersection of the lines $X_1$ and $Y_1$, and since the amplitude of the driving pulse in the first half of its duration is twice that in the second half of the pulse duration, which latter amplitude is equal to the amplitude of the driving pulse applied at the intersection of lines $X_1$ and $Y_1$, it will be apparent that the brightness of the light emitted at the intersection of lines $X_1$ and $Y_2$ will be three times the brightness of the light emitted at the intersection of lines $X_1$ and $Y_1$, that is, the light emitted at the intersection of lines $X_1$ and $Y_2$ will have a brightness corresponding to the [3] level of the detected video signal. similarly, light emission made to occur sequentially at the intersections of the row lines $X_1, X_2, \ldots$ and the column lines $Y_1, Y_2, \ldots$ and the brightness of the emitted lights is varied in sixteen steps in accordance with the detected levels of the video signal, whereby to display an accurate image the video signal.

With the video display system according to the present invention as described above, by changing the combination of the width and amplitude of the driving pulse, the suitable step of the brightness is selected, so that even if the video signal level is divided into sixteen steps or grades as shown in the figures, it is sufficient to change the amplitude of the driving pulse over only five steps or grades. Accordingly, even if the transistors $Q_1$, $Q_2, \ldots$ are ununiform in $h_{FE}$, the brightness control can be performed uniformly at the respective column lines due to small number of steps. Further, even when the video signal level is divided into, for example, 16 steps, it is sufficient to change the driving pulse width in only three steps. Therefore, the smallest pulse width can be made to be ¼ $T_H$, that is, about 16 micro seconds, as shown in FIG. 9, so that, when the start of light emission is delayed by about 10 micro seconds, as shown by the dotted lines in FIG. 9, the variation of brightness can be obtained accurately in correspondence with the change of the driving pulse.

The above described video display system has employed a flat panel in which discharge light emission is used, but it will be apparent that the video display system of the present invention can be applied to flat display panels in which light emission is achieved by liquid crystals, electroluminescence and the like.

Having described an illustrative embodiment of the invention, it will be apparent that many modifications and variations could be effected therein by one skilled in that art without departing from the spirit and scope of the present invention as defined in the appended claims.

I claim as my invention:
1. A video display system comprising:
   A. a display panel including a group of first parallel electrodes and a group of second parallel electrodes substantially perpendicular to said first electrodes;
   B. a group of first driving circuits connected to said first parallel electrodes respectively;
   C. A group of second driving circuits connected to said second electrodes respectively;
   D. A video signal source for supplying a video signal containing brightness information;
   E. a sync. separator connected to said video signal source for separating horizontal and vertical synchronizing signals from said video signal;
   F. means supplied with said horizontal synchronizing signals for driving said first driving circuits sequentially in synchronism with said horizontal synchronizing signals;
   G. signal sampling means connected to said video signal source for sampling said video signal and detecting the brightness level of the latter among a substantial number of brightness level steps therefor;
   H. pulse generating means connected to said sampling means for sequentially generating driving pulses which are characteristic of the detected brightness levels of the sampled video signal and which are modulated both in amplitude and width in accordance with amplitude steps and width steps, respectively, which are each of substantially lesser number than said number of brightness level steps, such that the combination of amplitude and width of each driving pulse represents a detected brightness level; and
   I. means for driving said second driving circuits in sequence in accordance with the driving pulses sequentially produced by said pulse generating means.

2. A video display system according to claim 1; in which said pulse generating means includes a plurality of pulse generating circuits respectively associated with said second driving circuits, each of said pulse generating circuits including a plurality of pulse generators having outputs that are connected together and being operable selectively to produce at said outputs respective basic pulses of characteristic amplitudes and characteristic widths which are coincident in time at least in part, and means for selecting said pulse generators of each of said pulse generating circuits which are to be operable simultaneously for driving the respective second driving circuit so that the combination of said basic pulses at the respective outputs will provide said driving pulses which are characteristic of said detected levels of the sampled video signal.

3. A video display system according to claim 1; in which said signal sampling means includes level detecting means having a plurality of outputs respectively corresponding to said number of level steps and at which level indicating signals selectively appear in response to detection of the respective level of said video signal; said pulse generating means includes 4-bit coder means connected with said outputs of the level detecting means for converting said level indicating signals into respective binary coded signals appearing at four weighted outputs of said coder means, and a plurality of pulse generating circuits respectively associated with said second driving circuits; each of said pulse generating circuits includes four pulse generators respectively connected with said four weighted outputs of the coder means so as to be selectively conditioned for operation by said binary coded signals, said four pulse generators of each pulse generating circuit have respective outputs at which respective weighted basic pulses of distinctive amplitudes and widths are produced in response to operation of said pulse generators, and said outputs of the pulse generators of each of said pulse generating circuits are connected together to the respective one of said second driving circuits for combining the weighted basic pulses produced by said pulse generators when at least two of the latter are simultaneously operated; and in which said means for driving said second driving circuits in sequence includes means producing gate signals which are applied in sequence to said pulse generating circuits, and each of said gate signals is applied simultaneously to said four pulse generators of the respective pulse generating circuit for causing operation of those generators which are then conditioned for operation by said binary coded signals.

4. A video display system according to claim 3; in which said basic pulses produced by three of said pulse generators in each of said pulse generating circuits are of the same amplitude and have different widths, and the basic pulses produced by the fourth of said four pulse generators is of a different amplitude than said basic pulses of said three pulse generators.

5. A video display system according to claim 3; in which said means for driving said first driving circuits comprises a start pulse generator supplied with said horizontal and vertical synchronizing signals for generating horizontal and vertical start pulses, a first shift register supplied with said horizontal and vertical start pulses for generating sequential pulses at a plurality of output terminals thereof, and means for connecting said output terminals of the first shift register to said first driving circuits, respectively; and in which said means for producing gate signals includes a timing pulse generator supplied with said horizontal start pulses for generating a train of timing pulses, and a second shift register supplied with said horizontal start pulses and said train of timing pulses for generating said gate signals at a plurality of output terminals of said second shift register which are connected to said pulse generators of the respective pulse generating circuits.

6. A video display system according to claim 1; in which said pulse generating means includes a plurality of pulse generating circuits respectively associated with said second driving circuits, each of said pulse generating circuits includes a plurality of pulse generators having respective output terminals connected together to the associated second driving circuit, said pulse generators of each of said pulse generating circuits being operative to provide respective weighted basic pulses of distinctive amplitudes and widths at said respective output terminals, and coding means responsive to the detected level of the video signal sampled by said signal sampling means for selectively conditioning for operation those of said pulse generators in each of said pulse generating circuits which are operative to provide weighted pulses combining to provide said driving pulses characteristic of said detected level; and in which said means for driving said second driving circuits in sequence includes a shift register having a plurality of output terminals respectively corresponding to said pulse generating circuits and at which gate signals appear in sequence, and each of said output terminals of the shift register is connected to all of said pulse generators of the respective pulse generating circuit so that each of said gate signals is effective to cause simultaneous operation of those pulse generators in the respective pulse generating circuit which are then conditioned for operation by said coding means.

7. A video display system, comprising:
 a display panel including a group of first parallel electrodes and a group of second parallel electrodes substantially perpendicular to said first electrodes;
 a group of first driving circuits connected to said first parallel electrodes, respectively;
 a group of second driving circuits connected to said second parallel electrodes, respectively;
 a source of video signals containing horizontal synchronizing signals, vertical synchronizing signals and video information signals, the video information signals being provided in successive horizontal line intervals;
 a synchronizing signal separator circuit coupled to said source for separating said horizontal and vertical synchronizing signals from said video signals;
 means responsive to said horizontal synchronizing signals for driving sequentially said first driving circuits;
 sampling means coupled to said source for sampling the level of said video signals during said horizontal line intervals;
 coding means coupled to said sampling means for producing an n-bit code corresponding to each sampled level;
 a group of pulse generating circuits coupled to said second driving circuits, respectively, each pulse generating circuit including n pulse generators adapted to receive respective ones of said n bits for producing n different output pulses, the output pulses produced by the respective pulse generators in a pulse generating circuit differing from each other by at least on of a pulse duration and pulse amplitude characteristic;
 timing means for actuating sequentially said pulse generating circuits in said group in correspondence with the sampling of said video signals;
 a group of algebraic adding means coupled to said pulse generating circuits, respectively, to algebraically add said n output pulses produced by the pulse generators in a pulse generating circuit for producing respective driving pulses, each driving pulse being modulated in both amplitude and width, the combination of amplitude and width representing the sampled level of said video signals; and means for applying said driving pulses to said second driving circuits, respectively.

8. A video display system according to claim 7 wherein each of said n pulse generators is adapted to produce an output pulse of one of at least three different amplitudes and of one of at least three different durations, depending upon whether a corresponding bit is applied thereto.

* * * * *